United States Patent
Zhang et al.

(10) Patent No.: US 9,817,107 B2
(45) Date of Patent: Nov. 14, 2017

(54) ABOVE-GROUND BUILDING RECOGNITION METHOD AND NAVIGATION METHOD COMBINING LASER AND INFRARED

(71) Applicant: HUAZHONG UNIVERSITY OF SCIENCE AND TECHNOLOGY, Wuhan, Hubei (CN)

(72) Inventors: Tianxu Zhang, Hubei (CN); Heng Yao, Hubei (CN); Peng Jiang, Hubei (CN); Sufei Fan, Hubei (CN); Yimeng Chen, Hubei (CN); Wenxuan Ma, Hubei (CN); Longwei Hao, Hubei (CN); Zhihui Yang, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/106,700
(22) PCT Filed: Feb. 10, 2015
(86) PCT No.: PCT/CN2015/072674
§ 371 (c)(1),
(2) Date: Jun. 20, 2016
(87) PCT Pub. No.: WO2016/106955
PCT Pub. Date: Jul. 7, 2016

(65) Prior Publication Data
US 2016/0363653 A1 Dec. 15, 2016

(30) Foreign Application Priority Data
Dec. 30, 2014 (CN) .......................... 2014 1 0844242

(51) Int. Cl.
*G01S 17/02* (2006.01)
*G01S 17/89* (2006.01)
(Continued)

(52) U.S. Cl.
CPC .......... *G01S 7/4802* (2013.01); *G01S 17/023* (2013.01); *G01S 17/107* (2013.01); *G01S 17/89* (2013.01);
(Continued)

(58) Field of Classification Search
CPC .... G01S 7/4802; G01S 17/023; G01S 17/107; G01S 17/89; G01S 17/933; G06K 9/0063
(Continued)

(56) References Cited

FOREIGN PATENT DOCUMENTS

| CN | 102175320 | 9/2011 |
| CN | 103486906 | 1/2014 |

(Continued)

OTHER PUBLICATIONS

I. Baker et al., "Advanced infrared detectors for multimode active and passive imaging applications," Proc. of SPIE, vol. 6940, 2008 (11 pages).
(Continued)

*Primary Examiner* — Daniel L Murphy
(74) *Attorney, Agent, or Firm* — Hamre, Schumann, Mueller & Larson, P.C.

(57) ABSTRACT

The present invention provides an above-ground building recognition method, including the following steps: (1) taking an infrared image of the ground from the air; (2) performing detection and positioning in the infrared image to determine a suspected target; (3) aiming at the suspected target to perform laser imaging; (4) performing range gating on a laser image to filter out foreground and background interference; and (5) extracting a shape feature of the suspected target from the laser image with interference filtered out, and taking the shape feature as a target matching element to perform matching with a target shape feature template, so as to recognize the target. In the method of the present invention, laser imaging is integrated into infrared imaging target positioning, so that an advantage of a large range of infrared imaging is utilized, and three-dimensional range information of laser imaging is also utilized, thereby effectively improving the precision of positioning a building.

3 Claims, 10 Drawing Sheets

(51) Int. Cl.
    *G01S 7/48*    (2006.01)
    *G01S 17/10*   (2006.01)
    *G06K 9/00*    (2006.01)
    *G01S 17/93*   (2006.01)
(52) U.S. Cl.
    CPC ....... *G06K 9/0063* (2013.01); *G06K 9/00637* (2013.01); *G01S 17/933* (2013.01)
(58) Field of Classification Search
    USPC ...................................................... 356/4.01
    See application file for complete search history.

(56) References Cited

FOREIGN PATENT DOCUMENTS

| CN | 103512579 | 1/2014 |
| CN | 104125372 | 10/2014 |
| CN | 104181612 | 12/2014 |
| EP | 2667142 | 11/2013 |

OTHER PUBLICATIONS

T. Jin et al., "Approach to Building Recognition in Complex Scenes," Computer Engineering, vol. 33, No. 6, Mar. 2007, p. 198-200, including English abstract.

International Search Report for international application No. PCT/CN2015/072674, dated Jun. 23, 2015 (6 pages, including English translation).

Written Opinion for international application No. PCT/CN2015/072674, dated Jun. 23, 2015 (8 pages, including English translation).

(A)

(B)

(C)

(D)

(E)

(F)

ABOVE-GROUND BUILDING RECOGNITION METHOD AND NAVIGATION METHOD COMBINING LASER AND INFRARED

TECHNICAL FIELD

The present invention belongs to the technical fields of imaging and automatic target recognition, and in particular, relates to an above-ground building recognition method.

BACKGROUND ART

A building is an important basic element of an artificial target, and recognition of a building can be used in fields such as urban planning, supervision, aircraft navigation, and collision avoidance. The above-ground background is complex, and various buildings have different sizes and shapes. An imaging altitude and an imaging angle of a payload on a movement platform are variable. Therefore, recognition and positioning of an above-ground building are difficult tasks. Especially in navigation guidance of an aircraft at night time, when only infrared imaging is used, with three-dimensional range information of flight scenarios lacked, a navigation effect is undesirable in a complex ground object background.

At present, target recognition is mainly accomplished by performing digital processing on infrared imaging. However, in infrared imaging, range information is lacked and three-dimensional information of a target scenario cannot be directly obtained, therefore, a target recognition effect is undesirable in a complex background. In view of this, in current researches, attempts are generally made on improvements to aspects such as extraction of a line feature of a building target and multi-level perception and combination of line features. For example, in "BUILDING TARGET RECOGNITION METHOD IN COMPLEX SCENARIO" by M N Taisong, Y E Congying, L I Cuihua, et al. (Computer Engineering, Vol. 33, No. 6, March 2007), a method for searching, based on a vertical line feature of a building target, an image for a region in which a building target exists is proposed to improve accuracy of detection and recognition; however, because an infrared image does not include range information and information about a three-dimensional structure of a target, the improvement effect is always limited.

SUMMARY

The present invention provides an above-ground building recognition method, an objective of which lies in that, in this method, laser imaging is integrated into infrared imaging target positioning, so that an advantage of a large range of infrared imaging is utilized, and three-dimensional range information of laser imaging is also utilized, thereby eventually implementing precise positioning of a building.

The above-ground building recognition method includes the following steps:

(1) taking an infrared image of the ground from the air;

(2) performing detection and positioning in the infrared image to determine a suspected target;

(3) aiming at the suspected target to perform laser imaging;

(4) performing range gating on a laser image to filter out foreground and background interference; and (5) extracting a shape feature of the suspected target from the laser image with interference filtered out, and taking the shape feature as a target matching element to perform matching with a target shape feature template, so as to recognize the target.

Furthermore, step (5) further includes: fusing a matching result and a local contrast feature of the suspected target in infrared imaging to recognize a target.

Furthermore, a specific implementation manner of step (5) is that:

calculating a ratio of a local contrast value of the suspected target in infrared imaging to a local contrast threshold, where the ratio is marked as a local contrast a of the suspected target;

calculating a similarity b between the target matching element and the target shape feature template; and calculating a target recognition probability $p=k1*a+k2*b$ and a weight coefficient $k1+k2=1$, where $k1 \le k2$, where a target having the maximum target recognition probability is a target recognition result.

Furthermore, a shape feature of a region of the suspected target includes an altitude-width ratio, a rectangularity, a longitudinal symmetry, and a region main axis direction.

An aircraft navigation method in which the above-ground building recognition method is applied is specifically:

acquiring a location of a building target by using the above-ground building recognition method;

constructing a building target coordinate system by taking the location of the building target as an origin;

acquiring an elevation angle γ and a heading angle φ of an aircraft at a current moment t, and calculating coordinates $(x_t, y_t, z_t)$ of the aircraft in the building target coordinate system at the moment t: $x_t=L \cos \gamma \sin \phi$, $y_t=L \cos \gamma \cos \phi$, and $z_t=L \sin \gamma$, where L is a distance between the aircraft and the building target at the moment t; and converting the coordinates $(x_t, y_t, z_t)$ of the aircraft in the building target coordinate system into a location in a geodetic system.

A technical effect of the present invention lies in that:

The present invention proposes an above-ground building positioning and recognition method combining laser and infrared, so that advantages of infrared-imaging target recognition and laser-imaging target recognition are combined. A passive working system of infrared imaging of a building target performed by an aircraft decides that information about a distance from the target and information about a three-dimensional shape of the target are lacked in output information of a seeker of the aircraft. For this reason, researches on an ATR (attenuated total reflection) method are merely carried out on a two-dimensional plane, resulting in that application of the ATR method is severely limited. Although information about a three-dimensional shape and a surface material of the target is missed, the ATR method has advantages such as a high frame frequency, a relatively large field of view, and a relatively long effective distance, so that search in a large area can be implemented. Laser imaging guidance has a short effective distance and has a frame frequency that is difficult to increase, and also an effective distance and a field of view are two indexes that restrain each other. Under the premise of ensuring an effective distance, only search at a short distance and in a small field of view can be implemented. However, laser imaging guidance has advantages over infrared guidance that a three-dimensional range image including geometrical intrinsic information of the target and a two-dimensional image including intrinsic information of a reflection spectrum of the surface material of the target can be acquired and that the scenarios in the front and back of the target can be segmented to simplify a complex background into a simple background. In the present invention, guidance combining laser and infrared makes full use of advantages of infrared guidance and laser guidance, so that requirements in different situations are satisfied.

In the present invention, features of a target region of infrared imaging and features of a target region of laser imaging are further chosen optimally according to characteristics of a building, and salient features of laser and infrared are fused effectively to form a matching element. Because a laser image is a three-dimensional range image including geometrical intrinsic information of a target, a laser range image can reflect a shape feature of the target more desirably than an infrared image does. At the same time, the infrared image can relatively desirably reflect a gray difference between the target and a background, and therefore the infrared image can reflect a local contrast of a target potential region relative to a local region of interest more desirably than the laser image does. The present invention fuses the two kinds of features and improves accuracy of matching.

In the present invention, a passive infrared imaging/active laser radar combined imaging system that combines the two can compensate for deficiency of a single-mode system, so that a relatively large imaging range in a search stage can be satisfied, and a target can be recognized precisely, thereby giving full play to the respective advantages and effectively improving precision of recognition.

BRIEF DESCRIPTION OF THE DRAWINGS

FIG. 3(A) is at a distance of 12000 meters and an elevation angle of 3°, FIG. 3(B) is at a distance of 10000 meters and an elevation angle of 2°, FIG. 3(C) is at a distance of 9000 meters and an elevation angle of 3°, FIG. 3(D) is at a distance of 8000 meters and an elevation angle of 4°, FIG. 3(E) is at a distance of 7000 meters and an elevation angle of 3°, and FIG. 3(F) is at a distance of 6000 meters and an elevation angle of 4°;

FIG. 5(A) is an image when the optical axis of the sensor moves to the center of a suspected target A in FIG. 4, and FIG. 5(B) is an image when the optical axis of the sensor moves to the center of a suspected target B in FIG. 4;

FIG. 6(A) is a laser image obtained when the optical axis of the sensor moves to the center of the suspected target A, and FIG. 6(B) is the laser image obtained when the optical axis of the sensor moves to the center of the suspected target B;

FIG. 8(A) is an image from imaging combining laser and infrared when an optical axis moves to the center of the suspected target A, and FIG. 8(B) is an image from imaging combining laser and infrared when the optical axis moves to the center of the suspected target B;

FIG. 10(A) is an image obtained after range gating is performed on FIG. 6(A), where a front range gate is 10400 meters, and a rear range gate is 10460 meters, and FIG. 10(B) is an image obtained after range gating is performed on FIG. 6(B), where a front range gate is 10200 meters, and a rear range gate is 10230 meters;

FIG. 11(A) is an image obtained after range gating is performed on FIG. 8(A), where a front range gate is 10400 meters, and a rear range gate is 10460 meters, and FIG. 11(B) is an image obtained after range gating is performed on FIG. 8(B), where a front range gate is 10200 meters, and a rear range gate is 10230 meters;

FIG. 12(A) is a schematic view of a result of edge detection performed on FIG. 10(A), and FIG. 12(B) is a schematic view of a result of edge detection performed on FIG. 10(B);

FIG. 15(A) is a bottom view, FIG. 15(B) is a left view, and FIG. 15 (c) is a front view;

FIG. 16(A) is a bottom view, FIG. 16(B) is a left view, and FIG. 16 (c) is a front view;

FIG. 17(A) is a bottom view, FIG. 17(B) is a left view, and FIG. 17 (c) is a front view;

FIG. 18(A) is a schematic view of a detected region of interest, and FIG. 18(B) is a schematic view of a detection result;

DETAILED DESCRIPTION

For clear understanding of the objectives, technical solutions and advantages of the present invention, detailed description of the present invention will be given below in conjunction with accompanying drawings and embodiments. It should be noted that the specific embodiments described herein are only meant to explain the present invention, and not to limit the present invention. Furthermore, the technical features involved in the embodiments of the present invention described below could be combined with each other as long as no confliction is caused.

Figure 1:
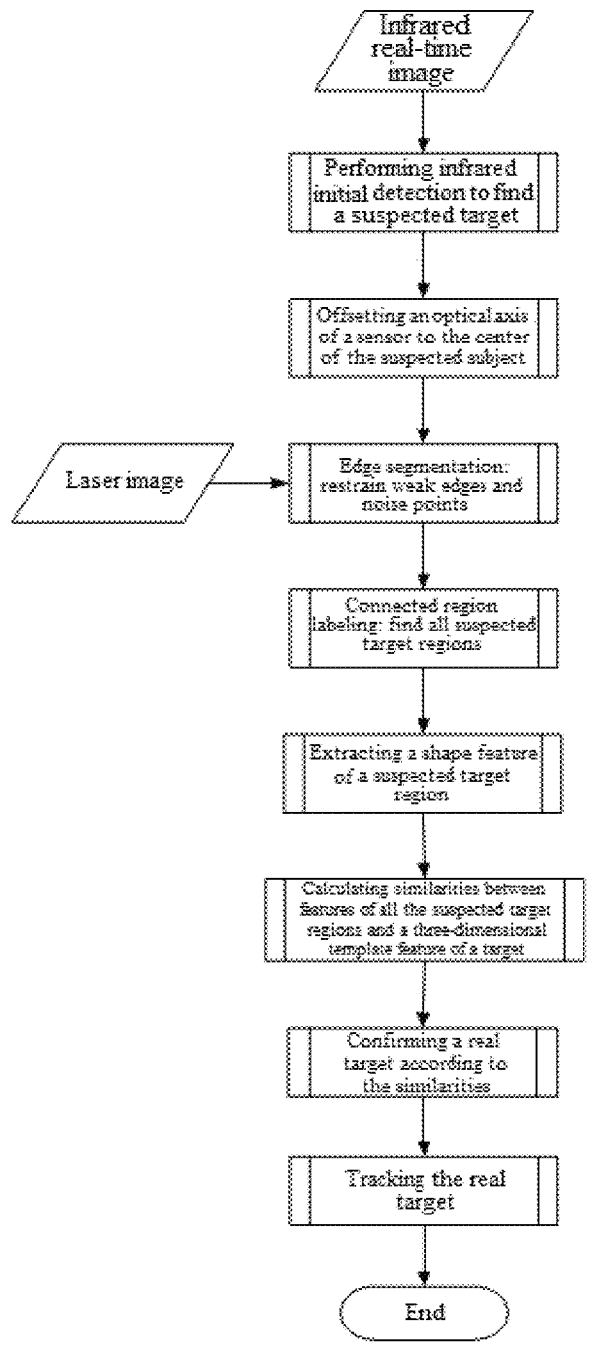
FIG. 1 is a general schematic flowchart of the present invention.

Steps of the present invention are described below with reference to a procedure in FIG. 1 and by taking the Twin Towers as an example:

Example 1

(1) Take an infrared image of the ground from the air.

Figure 2:
FIG. 2 is a real-time infrared image at an elevation angle of 3°, an altitude of 2000 meters, and a distance of 10220 meters from a target.

A real-time infrared image taken from the air by an aircraft at an elevation angle of 3°, at an altitude of 2000 meters, and at a distance of 10220 meters from a target is shown in FIG. 2.

(2) Perform detection and positioning in the infrared image to determine a suspected target.

(2.1) Construct a standard feature library

Figure 3:
FIG. 3 shows examples of structural elements in morphological background suppression of a target building to be recognized at a flight altitude of 2000 meters and a field angle of 3.5°×2.63°, where
Figure 3:
Figure 3:
Figure 3:
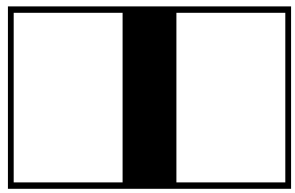
Figure 3:
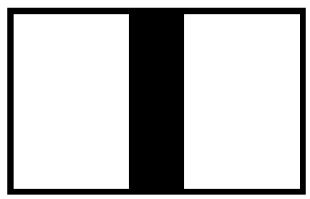
Figure 3:

Produce multi-scale structural elements of the target, and the structural elements of the target in different scales are shown in FIG. 3.

(2.2) Image enhancement step: perform histogram equalization on an original input image, so as to enhance an image contrast having a slight small dynamic range and increase a dynamic range of a gray value of a pixel, thereby achieving an effect of enhancing an overall contrast of the image.

(2.3) Morphological background suppression: choose a morphological structural element in FIG. 3(A) to perform opening operation on FIG. 2, so as to filter out a building or a background that is obviously different from a target building in shape and size, so that the gray level of the image is reduced.

(2.4) Gray level combination step: perform histogram statistics on the image after the processing of background suppression, the number of times each gray value appears is determined according to a threshold, and a gray value whose number of times is less than the threshold is combined with a nearest gray value whose number of times is greater than or equal to the threshold. The threshold here is 300.

(2.5) Feedback segmentation step

1) Perform gray level threshold segmentation on the image after gray level combination by using the gray level thereof as a threshold, to convert the image into a binary image.

2) Feature extraction step: label each region in the binary image, to calculate features, that is, area, center of gravity, perimeter, altitude, width and a shape factor, of each labeled region.

3) Feature matching step: perform feature matching on each region of interest according to each feature in the standard feature library, and if a region of interest matches successfully, keep the region as a region of interest in a next step of classification.

Figure 4:
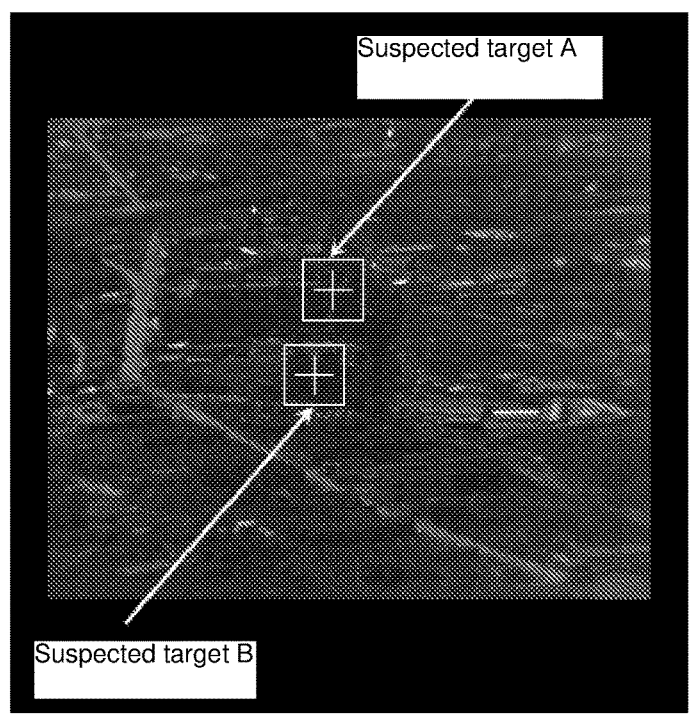
FIG. 4 is a suspected target detected in an infrared image obtained at an elevation angle of 3°, an altitude of 2000 meters, and a distance of 10220 meters from a target.

A result of initial infrared detection performed on FIG. 2 is shown in FIG. 4, and there are two first suspected targets A and B.

(3) Aim at a region of a first suspected target to perform laser imaging.

Figure 5:
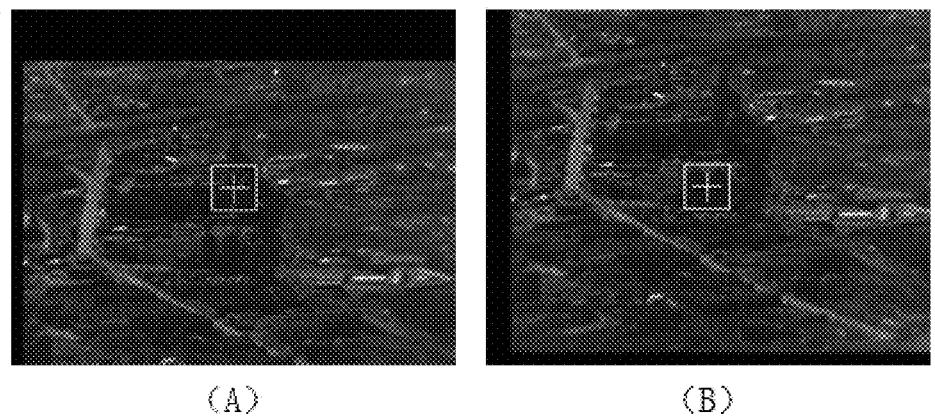
FIG. 5 is an infrared image when an optical axis of a sensor moves to the center of a suspected target, where
Figure 6:
FIG. 6 is a laser image having a size of 64×64 at an elevation angle of 3° and an altitude of 2000 meters, where

Move an optical axis of a sensor to the center of a suspected target: at an elevation angle of 3°, an altitude of 2000 meters, and a distance of 10220 meters from a target, the infrared image obtained when the optical axis of the sensor moves to the center of the suspected target A is shown in FIG. 5(A), and the infrared image obtained when the optical axis of the sensor moves to the center of the suspected target B is shown in FIG. 5(B). A laser image having a size of 64×64 obtained when the optical axis of the sensor moves to the center of each suspected target is shown in FIG. 6. FIG. 6(A) is the laser image obtained when the optical axis of the sensor moves to the center of the suspected target A, and FIG. 6(B) is the laser image obtained when the optical axis of the sensor moves to the center of the suspected target B.

Figure 7:
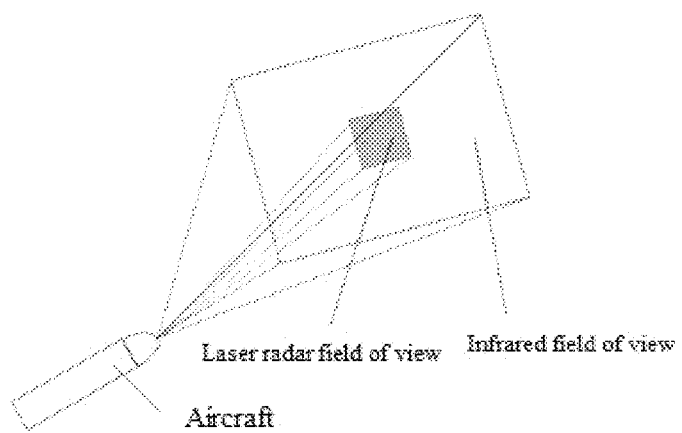
FIG. 7 is a schematic view of a field of view of a laser-infrared coaxial sensor.
Figure 8:
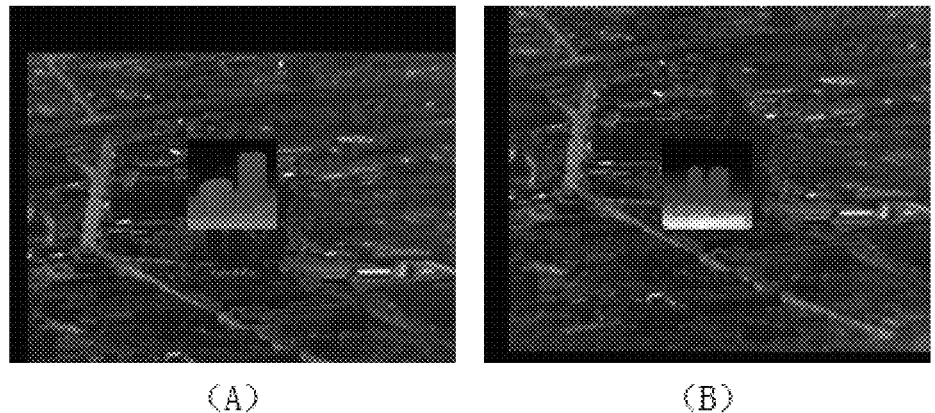
FIG. 8 is an image from imaging combining laser and infrared at an elevation angle of 3°, an altitude of 2000 meters, and a distance of 10220 meters from a target, where

After the optical axis moves to the center of the suspected target region, an image from imaging combining laser and infrared of a coaxial sensor can be obtained. A schematic view of a laser-infrared field of view of the sensor is shown in FIG. 7. The image from imaging combining laser and infrared obtained at an elevation angle of 3°, an altitude of 2000 meters, and a distance of 10220 meters from a target is shown in FIG. 8, where FIG. 8(A) is an image from imaging combining laser and infrared when the optical axis moves to the center of the suspected target A, and FIG. 8(B) is an image from imaging combining laser and infrared when the optical axis moves to the center of the suspected target B.

(4) Perform range gating on the laser image to filter out foreground and background interference.

Figure 9:
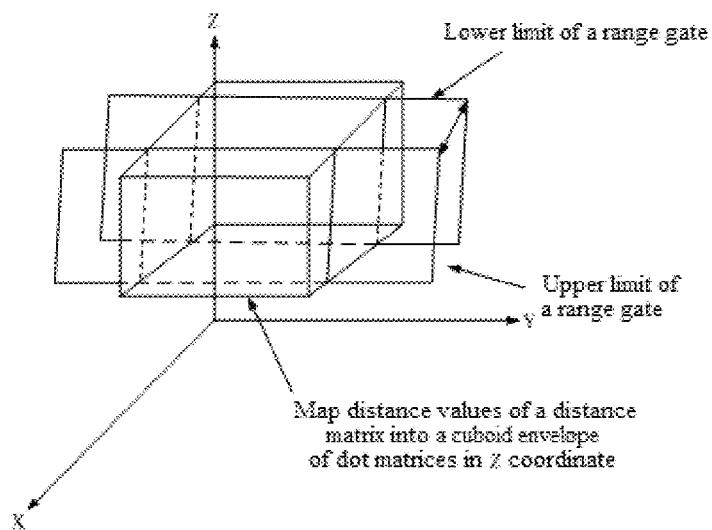
FIG. 9 is a principle diagram of laser range gating.
Figure 10:
FIG. 10 is a laser image obtained after range gating is performed, where
Figure 11:
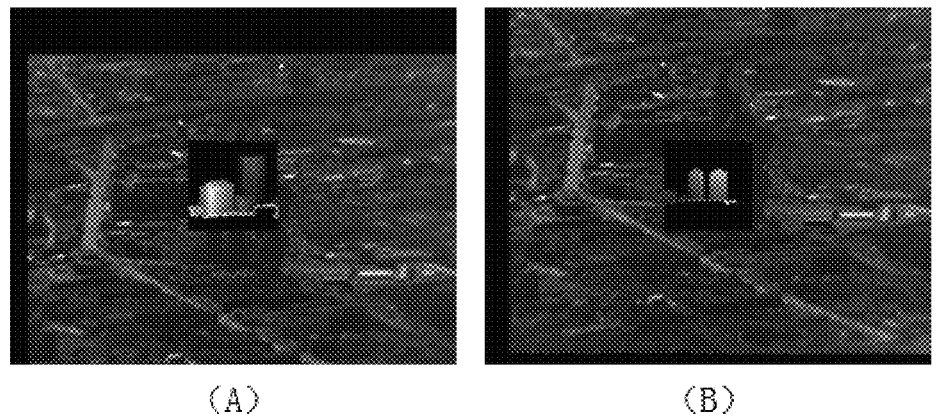
FIG. 11 is an image from imaging combining laser and infrared obtained after range gating is performed, where

A range gate is used to perform range gating, to filter out foreground and background interference. A principle of laser range gate gating is shown in FIG. 9. Range gating is performed on the laser image in FIG. 6 to obtain a result, as shown in FIG. 10, where FIG. 10(A) shows a result of performing range gating on FIG. 6(A) with a front range gate of 10400 meters and a rear range gate of 10460 meters, and FIG. 10(B) shows a result of performing range gating on FIG. 6(B) with a front range gate of 10200 meters and a rear range gate of 10230 meters. The image from imaging combining laser and infrared after range gating is performed is shown in FIG. 11, where FIG. 11(A) shows a result of performing range gating on FIG. 8(A) with a front range gate of 10400 meters and a rear range gate of 10460 meters, and FIG. 11(B) shows a result of performing range gating on FIG. 8(B) with a front range gate of 10200 meters and a rear range gate of 10230 meters.

(5) Extract a shape feature of the suspected target from the laser image with interference filtered out, and take the shape feature as a target matching element to perform matching with a target shape feature template, so as to recognize the target.

(5.1) Edge segmentation

Figure 12:
FIG. 12 shows a result of edge detection performed on FIG. 10, where

Perform edge segmentation on the laser image after range gating is performed, to suppress weak edges and noise points. A template [0.0965 0.4 0.0965] is used to perform a smoothing operation on the image, a horizontal-direction template, a vertical-direction template, a 45°-direction template, and a 135°-direction template are then used to perform filtering on the image in four directions, and threshold segmentation is then performed on the image after filtering, at the same time, weak edges having an area less than 1 and noise points are suppressed to obtain a result of edge detection. A result of edge detection performed on the laser image in FIG. 10 is shown in FIG. 12, where FIG. 12(A) shows a result of edge detection performed on FIG. 10(A), and FIG. 12(B) shows a result of edge detection performed on FIG. 10(B).

The horizontal-direction template is:

| 2  | 2  | 2  |
|----|----|----|
| 0  | 0  | 0  |
| -2 | -2 | -2 |

The vertical-direction template is:

| 2 | 0 | -2 |
|---|---|----|
| 2 | 0 | -2 |
| 2 | 0 | -2 |

The 45°-direction template is:

| 0 | 3  | 0  |
|---|----|----|
| 3 | 0  | -3 |
| 0 | -3 | 0  |

The 135°-direction template is:

|   |    |    |
|---|----|----|
| 0 | −3 | 0  |
| 3 | 0  | −3 |
| 0 | 3  | 0  |

(5.2) Connected Region Labeling

Perform connected region labeling on the image after edge segmentation, so that an outline of each independent suspected target can be obtained. Assuming that a background pixel of an edge image is 0 and a target pixel is 255, and a step of performing labeling of region growing in an 8 neighborhood is as follows:

1) Scan the image in an order from top to bottom and from left to right, and when a target pixel P is reached, label the target pixel P as a new label value L.

2) Take P as a seed point, and label target pixels in an 8 neighborhood of the seed point as L.

3) Label all adjacent target pixels in the 8 neighborhood of the pixel L as L, until the connected region labeling is completed.

4) Continue to scan the image in the order, and repeat the foregoing three steps, until all target pixels in the image have been labeled.

A starting point of each connected region is obtained by scanning an entire image in sequence, and a process of labeling each connected region is a process of recursively invoking a growth function. The growth function sequentially scans an 8 neighborhood of a target point. If a new target point is reached, a processing process of a current target point is pushed, and an 8 neighborhood of the new target point is scanned. In this way, target points are continuously pushed. When an 8 neighborhood of a target point does not have a new target point, the target point is popped. After all target points are popped, the connected region labeling is completed. A result of connected region labeling of FIG. 12(A) is shown in FIG. 13, and a result of connected region labeling of FIG. 12(B) is shown in FIG. 14.

(5.3) Extract a shape feature of the suspected target

Figure 13:
FIG. 13 is a schematic view of a result of connected region labeling of FIG. 12(A)
Figure 14:
FIG. 14 is a schematic view of a result of connected region labeling of FIG. 12(B)
Figure 15:
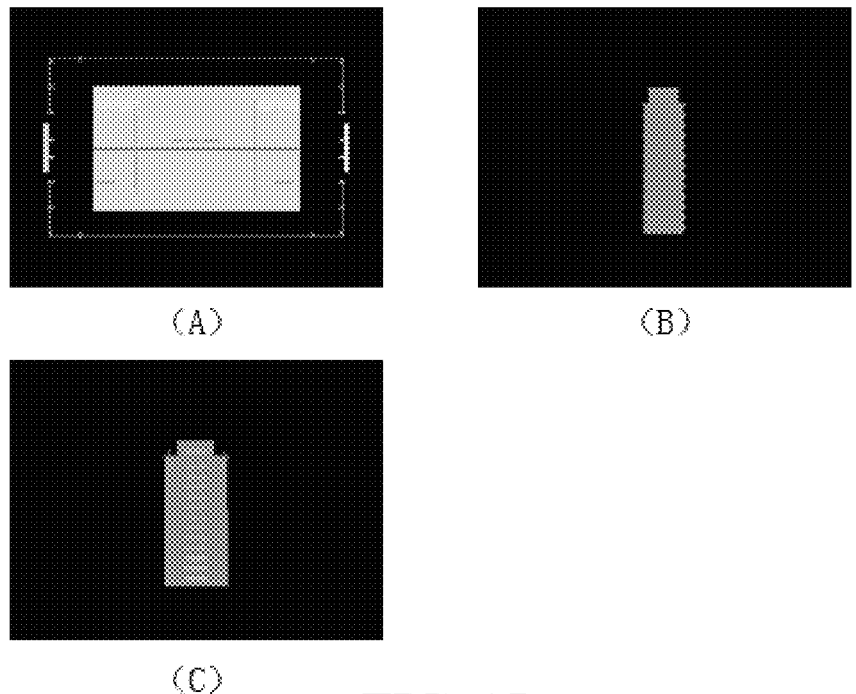
FIG. 15 is a three-dimensional view of a target, where

Perform shape analysis on each suspected target region in FIG. 13 and FIG. 14, to calculate an altitude-width ratio, a rectangularity, a longitudinal symmetry, and a region main axis direction of each suspected target region. Moreover, perform feature matching and recognition with each feature in model features, and keep a region of interest with features closest to the model features, so as to obtain a detection result, and a three-dimensional view of the target is shown in FIG. 15.

Feature values of a bottom view of the target are shown in the following table:

| Altitude-width ratio | Rectangularity | Longitudinal symmetry | Region main axis direction |
|---|---|---|---|
| 1.7140 | 0.7494 | 180 | 178.1645 |

Feature values of a front view of the target are shown in the following table:

| Altitude-width ratio | Rectangularity | Longitudinal symmetry | Region main axis direction |
|---|---|---|---|
| 2.1955 | 0.8846 | 180 | 90.0371 |

Feature values of a left view of the target are shown in the following table:

| Altitude-width ratio | Rectangularity | Longitudinal symmetry | Region main axis direction |
|---|---|---|---|
| 3.0333 | 0.8052 | 180 | 90.0569 |

Figure 16:
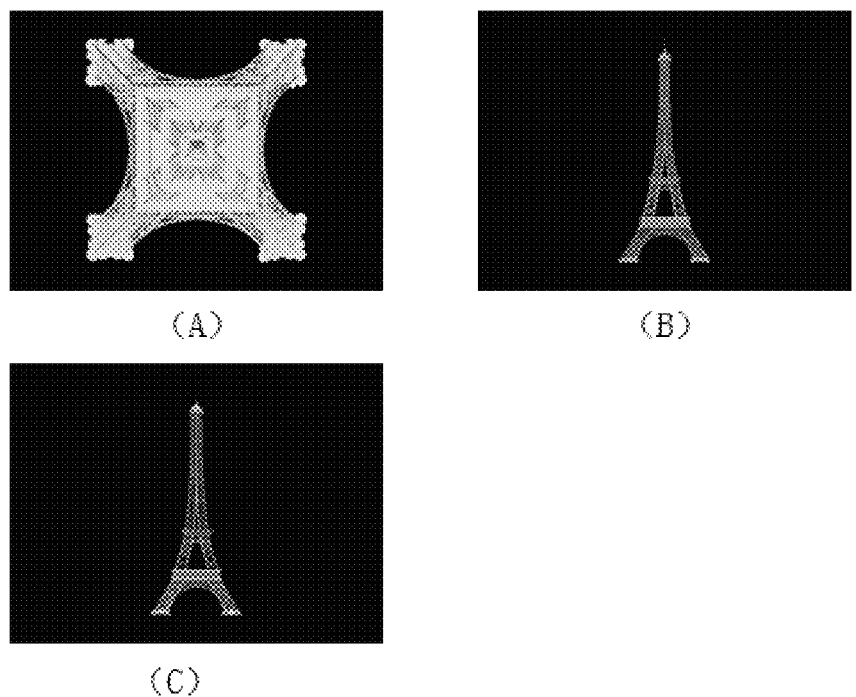
FIG. 16 is a three-dimensional view of the Eiffel tower, where
Figure 17:
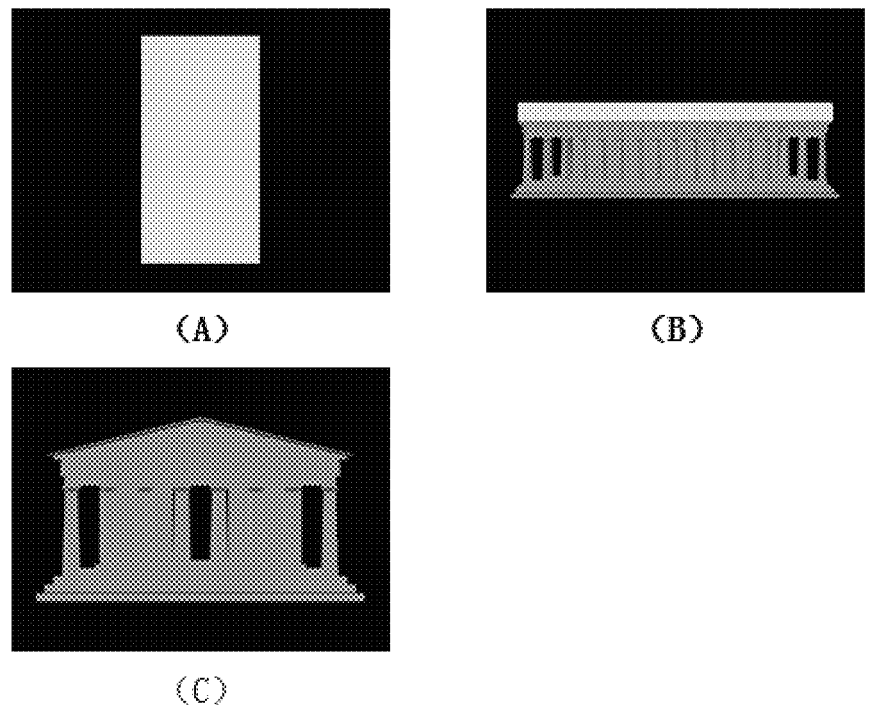
FIG. 17 is a three-dimensional view of the Parthenon temple, where

Three-dimensional views of the two typical targets, that is, the Eiffel tower and the Parthenon temple are shown in FIG. 16 and FIG. 17.

Feature values of a bottom view of the Eiffel tower are shown in the following table:

| Altitude-width ratio | Rectangularity | Longitudinal symmetry | Region main axis direction |
|---|---|---|---|
| 1.0140 | 0.0494 | 180 | 98.1645 |

Feature values of a front view of the Eiffel tower are shown in the following table:

| Altitude-width ratio | Rectangularity | Longitudinal symmetry | Region main axis direction |
|---|---|---|---|
| 2.4576 | 0.1355 | 180 | 90.2970 |

Feature values of a left view of the Eiffel tower are shown in the following table:

| Altitude-width ratio | Rectangularity | Longitudinal symmetry | Region main axis direction |
|---|---|---|---|
| 2.4576 | 0.1355 | 180 | 90.2970 |

Feature values of a bottom view of the Parthenon temple are shown in the following table:

| Altitude-width ratio | Rectangularity | Longitudinal symmetry | Region main axis direction |
|---|---|---|---|
| 1.9079 | 1 | 180 | 89.9579 |

Feature values of a front view of the Parthenon temple are shown in the following table:

| Altitude-width ratio | Rectangularity | Longitudinal symmetry | Region main axis direction |
|---|---|---|---|
| 1.7863 | 0.1493 | 180 | 179.9537 |

Feature values of a left view of the Parthenon temple are shown in the following table:

| Altitude-width ratio | Rectangularity | Longitudinal symmetry | Region main axis direction |
|---|---|---|---|
| 3.4262 | 0.6597 | 180 | 0.2067 |

Results of calculating features of the suspected target regions are shown in the following table:

| Suspected target region | Altitude-width ratio | Rectangularity | Longitudinal symmetry | Region main axis direction |
|---|---|---|---|---|
| FIG. 13(A) | 1.4444 | 0.2414 | 41 | 178.6822 |
| FIG. 13(B) | 1.5404 | 0.4556 | 163 | 102.6994 |
| FIG. 14(A) | 2.0154 | 0.4956 | 160 | 100.6244 |
| FIG. 14(B) | 1.5099 | 0.4729 | 151 | 104.6994 |

As can be seen from a spatial location relationship between the aircraft and the target building, features of the front view of the target building need to be chosen as feature templates, and similarities between the features of the suspected target and the features of the target shape feature template are calculated as follows:

| Suspected target region | Similarity in altitude-width ratio | Similarity in rectangularity | Similarity in longitudinal symmetry | Similarity in region main axis direction |
|---|---|---|---|---|
| FIG. 13(A) | 0.6579 | 0.2729 | 0.2278 | 0.0155 |
| FIG. 13(B) | 0.7016 | 0.5151 | 0.9056 | 0.8594 |
| FIG. 14(A) | 0.9181 | 0.5603 | 0.8889 | 0.8824 |
| FIG. 14(B) | 0.6878 | 0.5346 | 0.8389 | 0.8372 |

The detection results confirmed by using the laser image are shown in the following table:

| Suspected target region | Similarity in shape feature | Suspected target probability |
|---|---|---|
| FIG. 13(A) | 0.2935 | 29.35% |
| FIG. 13(B) | 0.7454 | 74.54% |
| FIG. 14(A) | 0.8124 | 81.24% |
| FIG. 14(B) | 0.7246 | 72.46% |

Figure 18:
FIG. 18 shows a result of laser detection, where

It may be concluded that the suspected target region FIG. 14(A) is the target region, the region of interest is shown in FIG. 18(A), and the recognition result is shown in FIG. 18(B).

As a comparison, similarities between shape features of the suspected target region and the shape features of the front view of the Eiffel tower are as follows:

| Suspected target region | Similarity in shape feature |
|---|---|
| FIG. 13(A) | 0.2638 |
| FIG. 13(B) | 0.2582 |
| FIG. 14(A) | 0.2343 |
| FIG. 14(B) | 0.2009 |

Similarities between the shape features of the suspected target region and the shape features of the front view of the Parthenon temple are as follows:

| Suspected target region | Similarity in shape feature |
|---|---|
| FIG. 13(A) | 0.6031 |
| FIG. 13(B) | 0.3218 |
| FIG. 14(A) | 0.2501 |
| FIG. 14(B) | 0.2746 |

Figure 19:
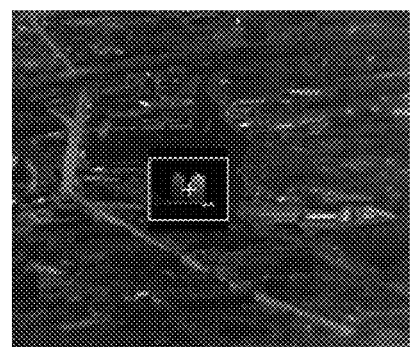
FIG. 19 shows a result of detection combining laser and infrared.

The present invention proposes a method of performing detection and recognition by using infrared-guided laser and performing confirmation and recognition, by using laser, on a result of initial infrared detection. As shown in FIG. 4, suspected target regions A and B will be obtained by initial infrared detection, and laser is then used to perform confirmation and detection on the suspected target regions A and B. Shape features of the suspected target regions A and B are extracted and compared with target feature templates, so as to choose a shape feature closest to a target shape feature, and the target region of the shape is taken as an eventual confirmation result. A result of detection combining laser and infrared is shown in FIG. 19.

Example 2

As an optimization, the present invention further provides a feature of an infrared-imaged suspected target region, which is fused with a shape feature of a laser-imaged suspected target region to form a target matching element. The feature of the infrared-imaged suspected target region is a local contrast of a target potential region. Because a laser image is a three-dimensional range image including geometrical intrinsic information of a target, a laser range image can reflect a shape feature of the target more desirably than an infrared image does. At the same time, the infrared image can relatively desirably reflect a gray difference between the target and a background, and therefore the infrared image can reflect a local contrast of the target potential region relative to a local region of interest more desirably than the laser image does. Therefore, the present invention fuses a local contrast feature of the target potential region of the infrared-imaged suspected target region with the shape feature of the laser-imaged suspected target region, to form a matching element to perform eventual confirmation and recognition.

Compared with Example 1, in this example, a step of fusing a feature from detection of the infrared image and a feature from detection of the laser image is added.

The local contrast of the target potential region is calculated according to the infrared image:

The target potential region is chosen from the local region of interest. For the target potential region, a location of a centroid is $(X_t, Y_t)$, a height is $H_t^m$, and a width is $W_t^m$. A local contrast $\zeta$ of the target potential region relative to the local region of interest is calculated, and a local contrast threshold is 3. The local contrast $\zeta$ is defined as a ratio of a gray mean value $\mu_t$ of the target potential region in a region of interest to be recognized to a gray standard deviation $\sigma_{roi}$ of the entire local region of interest, that is, $$\zeta = \frac{\mu_t}{\sigma_{roi}}.$$

A local contrast feature and a suspected target probability in each suspected target region are calculated according to the infrared image as follows:

| Suspected target region | Local contrast | Suspected target probability |
|---|---|---|
| FIG. 13(A) | 1.8 | 60% |
| FIG. 13(B) | 1.7 | 56.67% |
| FIG. 14(A) | 2.5 | 83.33% |
| FIG. 14(B) | 2 | 66.67% |

The results of detection of the laser image are shown in the following table:

| Suspected target region | Similarity in shape feature | Suspected target probability |
|---|---|---|
| FIG. 13(A) | 0.2935 | 29.35% |
| FIG. 13(B) | 0.7454 | 74.54% |
| FIG. 14(A) | 0.8124 | 81.24% |
| FIG. 14(B) | 0.7246 | 72.46% |

A local contrast feature obtained through infrared detection and a shape feature obtained through laser detection are fused, k1=k2=0.5, and the suspected target probabilities are as follows:

| Suspected target region | Local contrast | Similarity in shape feature | Fusion result detected suspected target probability |
|---|---|---|---|
| FIG. 13(A) | 1.8 | 0.2935 | 44.68% |
| FIG. 13(B) | 1.7 | 0.7454 | 65.61% |
| FIG. 14(A) | 2.5 | 0.8124 | 82.29% |
| FIG. 14(B) | 2 | 0.7246 | 69.57% |

It may be concluded that the suspected target region FIG. 14(A) is a target region. In the example, salient laser and infrared features are effectively fused to form a matching element. The shape feature obtained from laser detection and the local contrast feature obtained from infrared detection are fused and taken as a matching element for eventual confirmation and detection. In Example 1, the shape feature obtained from laser detection is directly taken as a matching element for eventual detection; in comparison, the method used in the example has a more accurate recognition result, so that a target feature becomes clear to the utmost extent.

Application description: application in aircraft navigation

Figure 20:
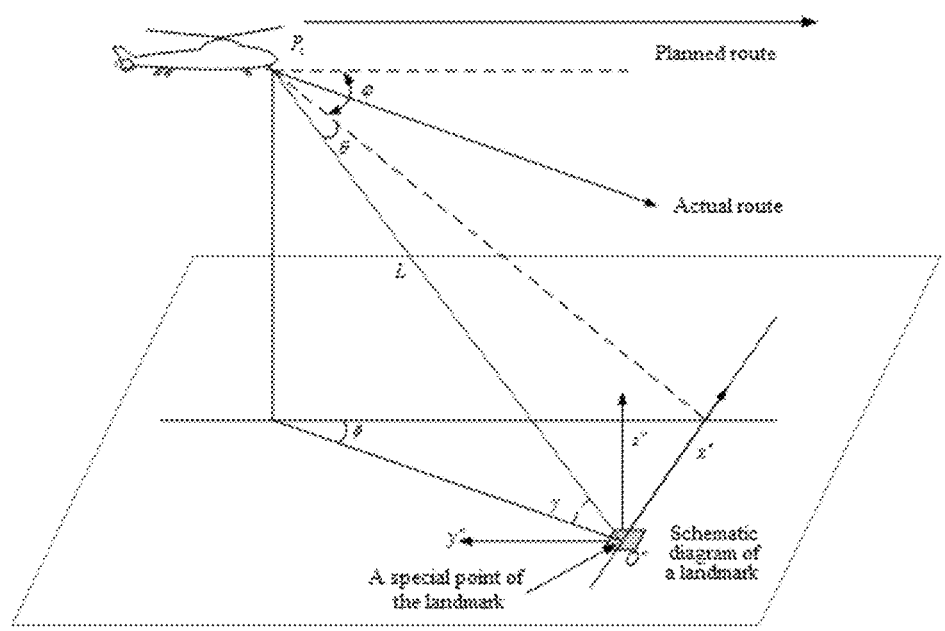
FIG. 20 is a schematic view of solving a location of an aircraft in a target coordinate system.

An aircraft captures a building target, and a spatial location of the aircraft is determined according to latitude and longitude information of the building target, which is specifically:

Information about the captured building target is acquired. A schematic view of solving a location of an aircraft is shown in FIG. 20. The building target is taken as an origin O" to construct a building target coordinate system O"x"y"z". At a moment t, an elevation angle γ, and a heading angle φ of the aircraft are acquired. Therefore, the coordinates $(x_t, y_t, z_t)$ of the aircraft in the building target coordinate system at the moment t are: $x_t = L \cos \gamma \sin \phi$, $y_t = L \cos \gamma \cos \phi$, and $z_t = L \sin \gamma$, where L is a distance between the aircraft and the building target at the moment t, and may be acquired by means of laser ranging.

After the coordinates of the aircraft in the target coordinate system are obtained, the coordinates of the aircraft in a geodetic system are calculated according to the geodetic coordinates of the target. The coordinates of the aircraft in the geodetic system is used to perform error calibration on an inertial navigation system, thereby implementing precise navigation of the aircraft.

A person skilled in the art easily understands that the foregoing provides only preferred embodiments of the present invention, which are not used to limit the present invention. Any modifications, equivalent replacements, improvements, and the like made within the spirit and principle of the present invention shall all fall within the protection scope of the present invention.

The invention claimed is:

1. An above-ground building recognition method, comprising the following steps:
   (1) taking an infrared image of the ground from the air;
   (2) performing detection and positioning in the infrared image to determine a suspected target;
   (3) aiming at the suspected target to perform laser imaging;
   (4) performing range gating on a laser image to filter out foreground and background interference; and
   (5) extracting a shape feature of the suspected target from the laser image with interference filtered out, taking the shape feature as a target matching element to perform matching with a target shape feature template, and fusing a matching result and a local contrast feature of the suspected target in infrared imaging, so as to recognize the target, wherein a specific implementation manner of step (5) is that:
   calculating a ratio of a local contrast value of the suspected target in infrared imaging to a local contrast threshold, wherein the ratio is marked as a local contrast a of the suspected target;
   calculating a similarity b between the target matching element and the target shape feature template; and
   calculating a target recognition probability p=k1*a+k2*b and a weight coefficient k1+k2=1, wherein k1≤k2, wherein
   a target having the maximum target recognition probability is a target recognition result.

2. The above-ground building recognition method according to claim 1, wherein a shape feature of a region of the suspected target comprises an altitude-width ratio, a rectangularity, a longitudinal symmetry, and a region main axis direction.

3. An aircraft navigation method in which the above-ground building recognition method according to claim 1 is applied, wherein the method is specifically:
   acquiring a location of a building target by using the above-ground building recognition method according to claim 1;
   constructing a building target coordinate system by taking the location of the building target as an origin;
   acquiring an elevation angle γ and a heading angle φ of an aircraft at a current moment t, and calculating coordinates $(x_t, y_t, z_t)$ of the aircraft in the building target coordinate system at the moment t: $x_t = L \cos \gamma \sin \phi$, $y_t = L \cos \gamma \cos \phi$, and $z_t = L \sin \gamma$, wherein L is a distance between the aircraft and the building target at the coordinate system at the moment moment t; and
   converting the coordinates $(x_t, y_t, z_t)$ of the aircraft in the building target coordinate system into a location in a geodetic system.

* * * * *